(12) United States Patent
Madera

(10) Patent No.: US 11,093,318 B2
(45) Date of Patent: Aug. 17, 2021

(54) DATA INTEGRATION PROCESS REFINEMENT AND REJECTED DATA CORRECTION

(71) Applicant: INTERNATIONAL BUSINESS MACHINES CORPORATION, Armonk, NY (US)

(72) Inventor: Cedrine Madera, Castelnau-le-Lez (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1091 days.

(21) Appl. No.: 15/631,771

(22) Filed: Jun. 23, 2017

(65) Prior Publication Data
US 2018/0373583 A1 Dec. 27, 2018

(51) Int. Cl.
*G06F 11/07* (2006.01)
*G06N 3/08* (2006.01)
(Continued)

(52) U.S. Cl.
CPC ........ *G06F 11/0793* (2013.01); *G06F 16/254* (2019.01); *G06N 3/082* (2013.01); *G06N 5/025* (2013.01); *G06N 20/00* (2019.01)

(58) Field of Classification Search
CPC .............. G06F 11/0793; G06F 16/254; G06F 17/30563; G06N 3/082; G06N 20/00; G06N 5/025
See application file for complete search history.

(56) References Cited

U.S. PATENT DOCUMENTS 7,321,939 B1 1/2008 Porter
8,019,795 B2 9/2011 Anderson et al.
(Continued)

FOREIGN PATENT DOCUMENTS

WO 2002001415 A2 10/2003
WO 2012166581 A2 12/2012
WO 2016036940 A1 3/2016

OTHER PUBLICATIONS

"Gartner predicts $143 billion in data center spending in 2014" [retrieved from the Internet on Apr. 27, 2017]. Retrieved from Internet URL: <https://www.delphix.com/blog/delphix-announcements/gartner-predicts-143-billion-data-center-spending-2014>, © 2017 Delphix Corp., Apr. 9, 2014, 1 pg.
(Continued)

*Primary Examiner* — Kamran Afshar
*Assistant Examiner* — Brent Johnston Hoover
(74) *Attorney, Agent, or Firm* — Michael O'Keefe; Matthew M. Hulihan; Heslin Rothenberg Farley & Mesiti PC

(57) ABSTRACT

Data integration process/tool refinement and correction of rejected data. A method acquires rejected data from a data integration tool, the rejected data rejected by the data integration tool during a data integration process. The method applies machine learning to a cognitive system, the machine learning being based at least in part on at least some of the acquired rejected data, and the machine learning including training the cognitive system to identify corrections to data elements to facilitate data element acceptance by the data integration tool. The method analyzes a data element of the acquired rejected data and identifies a correction to apply to the data element. The method applies the correction to the data element to obtain a corrected data element. The method also provides the corrected data ele-
(Continued)

ment to the data integration tool for acceptance by the data integration tool and provision to a target.

16 Claims, 7 Drawing Sheets

(51) Int. Cl.
*G06F 16/25* (2019.01)
*G06N 5/02* (2006.01)
*G06N 20/00* (2019.01)

(56) References Cited

U.S. PATENT DOCUMENTS

| | | |
|---|---|---|
| 8,024,369 B2 | 9/2011 | Pellegrini et al. |
| 9,286,361 B2 | 3/2016 | Greenwood et al. |
| 9,324,022 B2 | 4/2016 | Williams, Jr. et al. |
| 9,406,018 B2 | 8/2016 | Upadhyaya et al. |
| 9,449,060 B2 | 9/2016 | Dhayauple et al. |
| 2012/0246170 A1 | 9/2012 | Iantorno |
| 2012/0330911 A1 | 12/2012 | Gruenheid et al. |
| 2014/0149322 A1 | 5/2014 | LaVoie et al. |
| 2016/0078149 A1 | 3/2016 | Gaucher et al. |
| 2016/0267082 A1* | 9/2016 | Wong .................. G06F 16/164 |
| 2017/0132525 A1* | 5/2017 | Rozier ................. G06F 16/215 |

OTHER PUBLICATIONS

"ETL Tools—Top 10 ETL Tools Reviews" [retrieved from the Internet on Apr. 27, 2017]. Retrieved from Internet URL: <http://www.databaseetl.com/etl-tools-top-10-etl-tools-reviews/>, © 2017 Database ETL, 4 pgs.

"Gartner Magic Quadrant 2016: Data Integration Tools. Informatica recognized Leader for the 11th consecutive year" [retrieved from the Internet on Apr. 27, 2017]. Retrieved from Internet URL: <https://www.informatica.com/fr/data-integration-magic-quadrant.html>, © 2017 Informatica, 4 pgs.

McBurne, Vincent, "What is New, Updated or Dropped in Datastage 11.5", http://it.toolbox.com/blogs/infosphere/what-is-new-updated-or-dropped-in-datastage-115-69935, Sep. 28, 2015, 4 pgs.

Cyriac, Johnson, "How to Use Error Handling Options and Techniques in Informatica Powercenter", http://www.disoln.org/2014/04/Error-Handling-Options-and-Techniques-in-Informatica-PowerCenter.html, Apr. 7, 2014, 5 pgs.

Mell, Peter, et al., "The NIST Definition of Cloud Computing", NIST Special Publication 800-145, Sep. 2011, Gaithersburg, MD, 7 pgs.

\* cited by examiner

DATA INTEGRATION PROCESS REFINEMENT AND REJECTED DATA CORRECTION

BACKGROUND

Data integration tools and processes are used to populate decision support systems (DSSs) and other types of systems. When building or implementing a data integration process to populate a DSS, the user can utilize an 'Extract, Transform, Load' methodology in which data is extracted from data sources, transformed for storage in a proper structure or format, and stored ("loaded") into a target for later access. Extract, Transform, Load (ETL) processes are implemented by system/programs typically referred to as ETL tools, an example of which is the IBM Infosphere® Information Server offered by International Business Machines Corporation, Armonk, N.Y., U.S.A. (of which INFOSPHERE is a registered trademark). An ETL tool is an example type of data integration tool, and an ETL process performed by an ETL tool is an example process for data integration. Existing data integration practices, for instance processes implemented or leveraged by ETL tools, do not adequately handle data rejection; often times when data is rejected by a data integration tool, either the rejection itself or knowledge that may be gleaned from the rejection is lost.

SUMMARY

Shortcomings of the prior art are overcome and additional advantages are provided through the provision of a computer-implemented method. The method acquires rejected data from a data integration tool, the rejected data rejected by the data integration tool during a data integration process. The method applies machine learning to a cognitive system, the machine learning being based at least in part on at least some of the acquired rejected data, and the machine learning including training the cognitive system to identify corrections to data elements to facilitate data element acceptance by the data integration tool. The method analyzes a data element of the acquired rejected data and identifies a correction to apply to the data element. The method applies the correction to the data element to obtain a corrected data element. The method also provides the corrected data element to the data integration tool for acceptance by the data integration tool and provision to a target.

Further, a computer system is provided that includes a memory and a processor in communication with the memory, wherein the computer system is configured to perform a method. The method acquires rejected data from a data integration tool, the rejected data rejected by the data integration tool during a data integration process. The method applies machine learning to a cognitive system, the machine learning being based at least in part on at least some of the acquired rejected data, and the machine learning including training the cognitive system to identify corrections to data elements to facilitate data element acceptance by the data integration tool. The method analyzes a data element of the acquired rejected data and identifies a correction to apply to the data element. The method applies the correction to the data element to obtain a corrected data element. The method also provides the corrected data element to the data integration tool for acceptance by the data integration tool and provision to a target.

Yet further, a computer program product including a computer readable storage medium readable by a processor and storing instructions for execution by the processor is provided for performing a method. The method acquires rejected data from a data integration tool, the rejected data rejected by the data integration tool during a data integration process. The method applies machine learning to a cognitive system, the machine learning being based at least in part on at least some of the acquired rejected data, and the machine learning including training the cognitive system to identify corrections to data elements to facilitate data element acceptance by the data integration tool. The method analyzes a data element of the acquired rejected data and identifies a correction to apply to the data element. The method applies the correction to the data element to obtain a corrected data element. The method also provides the corrected data element to the data integration tool for acceptance by the data integration tool and provision to a target.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

As noted, an ETL process nominally includes three steps:
1. Extract—select/extract data from the data source(s) and/or data set(s);
2. Transform—integrate data of the data sets/sources, apply controls to the data, transform the data; and
3. Load—load the result of the transformation(s) to a target.

If during step 2 (transform) some resulting data does not comport with controls that have been implemented, e.g. by an administrator or other user, the data may be rejected from the integration tool. An example type of control is a technical control that is linked with the target database(s) into which the ETL tool loads data. For instance, a target database may reject an attempt to load data due to improper format (attempting to inject a numerical value when the database expects a character), or other reasons. A technical control may be automatically applied and enforced, for instance because the database target itself may reject the load attempt. Another type of control is a business rule control with an underlying business rule that applies a binary (yes or no) filter in terms of data acceptance. If the business rule produces a 'No', the data may be rejected, otherwise it may be accepted and written out to the target. Another example is a control over acceptance of data based on recognition, for instance data about a product code that is not already known by the system. If data to be loaded is affiliated with a given product code that is unknown to the system (e.g. the target database or perhaps the ETL tool itself), the data that is affiliated with the unknown product code may be rejected.

Figure 1:
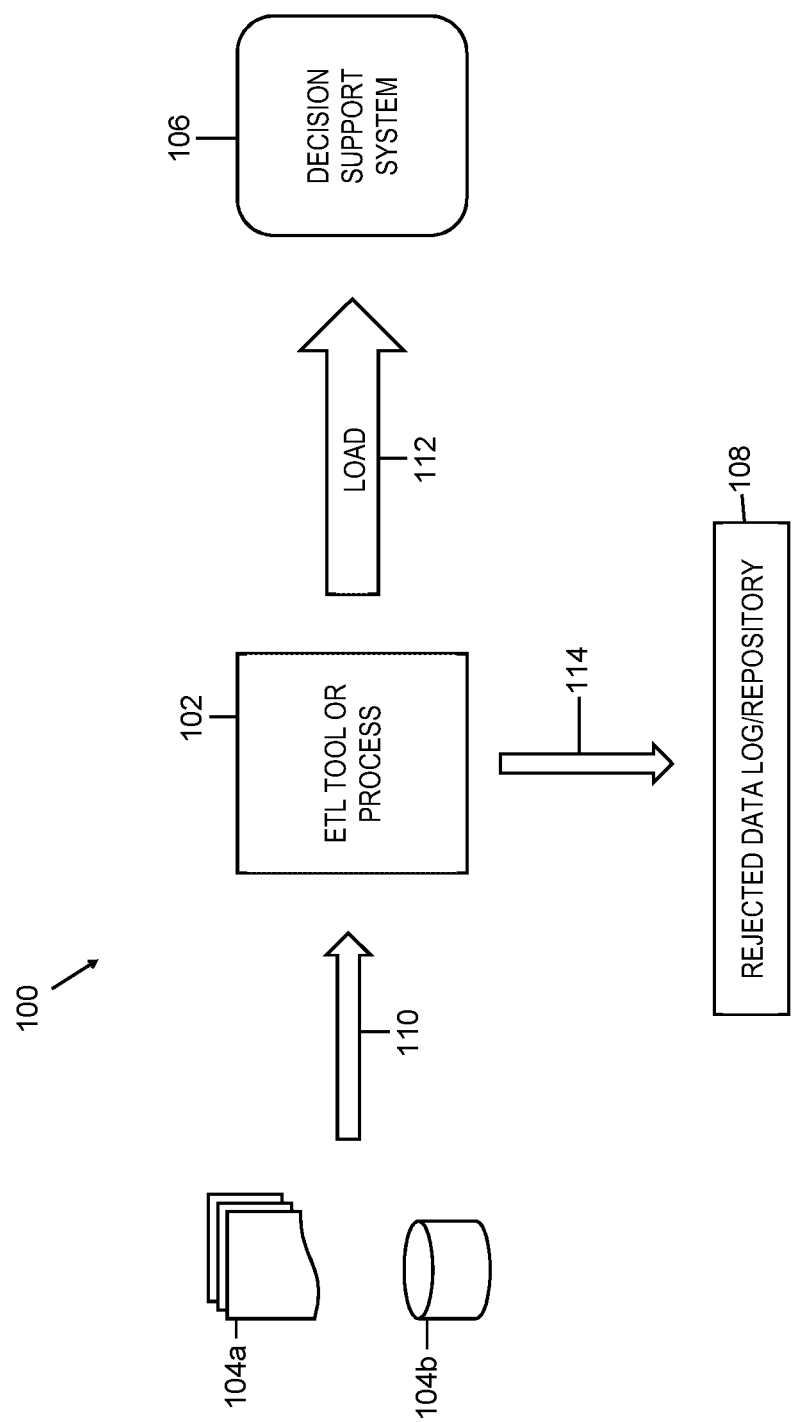
FIG. 1 depicts an example computing environment for data integration.

FIG. 1 depicts an example computing environment 100 for data integration as described above. A data integration tool/process (e.g. ETL tool/process) 102, which may be implemented as one or more computer systems and/or software executing thereon, extracts data from data sets/sources 104a, 104b. Example data sources include relational databases (DB2, SQL, etc.), comma separated value (CSV) files, and COBOL programs, among others. Example data sets include third-party data from a third-party system, data from sensor(s), and log files, among others.

If the ETL tool/process 102 and/or target accepts a given data element, that data is loaded to the target—in this example decision support system 106—which may be implemented as one or more computer systems and/or software executing thereon. If the given data element is rejected by the ETL tool/process 102, the data element is rejected and an indication of that rejection, optionally with the rejected data itself, is logged or stored in a repository 108.

Communication 110, 112, 114, shown as arrows extending between components of FIG. 1 may occur over any appropriate wireless or wired communication link(s) for communicating data, which communication link(s) can encompass one or more local area network(s) and/or wide area network(s). Thus, in some embodiments, components form and/or communicate via one or more intervening networks over wired and/or wireless communications links. Additionally or alternatively, the log/repository for rejected data may be incorporated into the ETL tool/process 102, rather than reside as a separate component.

Rejected data and/or indications of the rejections may be logged, saved in a directory, or discarded as desired. Sometimes the ETL tool itself has a log/repository. In other examples, the information is sent to a separate system for logging/storage. The data rejected by the ETL tool provides potentially valuable knowledge usable by the decision support system or target system, for instance the target system to which the data, if not rejected, would otherwise be loaded as part of the ETL process. However, in some approaches, log collection, analysis, data correction, and reinjection is performed manually by a user if at all.

Described herein are aspects to correct, treat, and re-introduce rejected data back into the data integration process. There is no automatic process, integrated with ETL tools, that leverage rejected data to perform these actions. This differs from approaches in which a user intervenes to read and comprehend the log, make necessary adjustments, and feed the data back into the system. Further aspects described herein can leverage advanced knowledge, for instance based on historical data and behavior, to proactively address anticipated or likely data rejections and modify the behavior of the data integration tool via additions, deletions, and/or modifications to controls in order to prevent the same or similar types of data rejections. Thus, aspects can correct data and reinject the corrected data, and further aspects can predict occurrences of errors/error types and proactively address them rather than awaiting their detection and rejection, and then having to subsequently separately address it. By way of specific example in which a numerical result is to instead be loaded to the target as a character/string, data correction may take the rejected numerical value and cast it as a character/string for reinjection, and error prediction may implement a control for the ETL tool that automatically casts a numerical result to a character/string prior to the numerical result being examined and rejected by the ETL tool.

Some aspects described herein leverage a cognitive system with machine learning capabilities and corpus-cognitive functions, the cognitive system for handling rejected data, to, automatically in some examples, treat a data rejection, integrate with or directly into an ETL tool as a new feature, and/or improve existing control rules with suggestions based on the cognitive system's ongoing learning.

An example cognitive system with machine learning capabilities is the IBM Watson line of offerings from International Business Machines Corporation. "Cognitive system" can refer to physical computer system(s) and/or software executing on computer system(s) to perform cognitive functions described herein.

Aspects described herein can automate through machine learning and cognitive system capabilities a rejected data element correction and re-injection process for targets, such as a decision support system target. For instance, the cognitive system can learn by itself and propose new control rules to increase data acceptance and decrease data rejection by the data integration tool. It could automatically propose to administrators new control rules and/or modified versions of existing control rules, who can accept or reject the proposals. Additionally or alternatively, a proposed control rule/modification may be automatically applied, for instance in situations where the cognitive system is sufficiently confident (i.e. at or beyond a threshold) that a control rule or modification is to be applied, rather than waiting for an administrator to accept the proposed rule or modification.

The volume of data rejected from a data integration tool might be so large that it directly, negatively impacts the time for the data integration tool to deliver trusted and accurate information. Evidence also shows that significant time and money are spent on data integration processes and database management for decision support systems. Aspects described herein provide automatic processes to analyze, treat, correct (or delete) and reinject corrected data elements. Additionally, rather than relying on a programming system to define the behavior in terms of data reinjection and data integration tool refinement, aspects leverage machine learning capabilities from a cognitive system having a robust corpus to practice and learn how to correct rejected data, for instance based on the lack of a matching control rule to address the rejected data, and to augment, refine, and improve the control rules of the data integration tool. In one example, there may be no existing control rule to address the rejection that was observed, so aspects described herein might propose a new control rule. In another example, there may be a control rule in place that is failing to satisfy the desired data acceptance/rejection objectives, in which case aspects described herein can identify and address that by determining a new control rule or modified version of the existing control rule.

Existing data integration processes, performed by ETL tools performing such processes, are thereby improved. By adding the cognitive function to prevent, correct, treat, and re inject rejected data, data quality for data integration will improve to deliver better results. The cognitive system is educated and trained by the ongoing learning to learn of the appropriate corrections to apply when data is rejected from a data integration tool and to apply those corrections in order to inject the corrected data into the data integration tool.

By optimizing the treatment of rejected data, this enables the tool to accelerate information delivery and save time (and money) for data consumers. By including machine learning capabilities, this improves the controls implemented in the data integration process/tool.

In an example process, there is (i) an initial education/training of the cognitive system (for instance with an initial corpus of information provided to the system), which continues during the ongoing operation of the system, and which learns over time how particular rejected data elements are to be handled and actions to take to refine the data integration tool. During the process, (ii) data integration tool control rules may be created, automatically and/or manually by administrators or other users, for possible application to data integration tool(s). An example automated creation of a control occurs when the system recognizes a pattern in a particular type of correction that tends to be applied to a particular type of rejected data. The system might automatically generate and apply the control rule to the data integration tool.

The process also (iii) integrates the cognitive system into or with the data integration tool, and (iv) launches the data integration process. It is noted that the above aspects (i)-(iv) need not be performed serially or in the order discussed above. For example, the data integration process may be active while the cognitive system is initially trained, and the integration between the cognitive system and data integration tool may be immediate. Other sequences, involving concurrent and/or serial performance of (i)-(iv) above, are possible.

Figure 2:
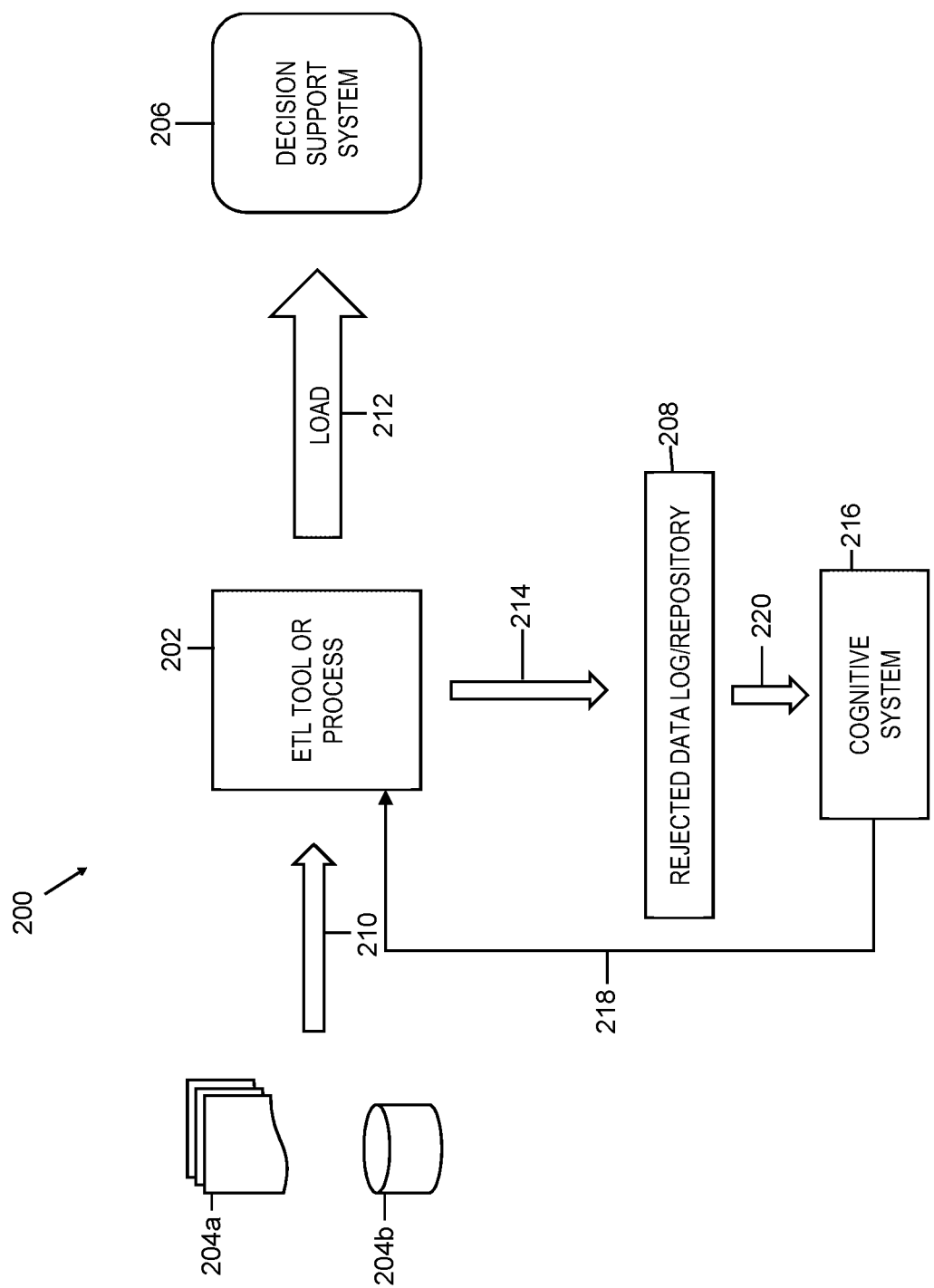
FIG. 2 depicts another example computing environment for data integration, in accordance with aspects described herein.

FIG. 2 depicts another example computing environment 200 for data integration, in accordance with aspects described herein. The environment of FIG. 2 includes a cognitive system with machine learning algorithms that integrates with the data integration tool.

The environment 200 includes data sets/sources 204a, 204b, ETL tool/process 202, DSS 206, rejected data log/repository 208 and communication links 210, 212, 214 that are largely analogous to the corresponding components described with reference to FIG. 1.

FIG. 2 also includes cognitive system 216 that acquires rejected data from the log/repository 208 (or in some examples the ETL tool/process directly if there is no intervening log/repository). This acquisition is achieved via communication link 220 in this example. Machine learning is applied to the cognitive system 216 to, for instance, study and construct algorithms that learn from rejected data and predict/develop control rules for implementation. In some embodiments, cognitive system 216 detects rejected data, analyzes data elements of the rejected data, auto-corrects or proposes corrections to those elements, prompts users for validation on a detection or correction, and/or reinjects corrected data elements, e.g. corrected versions of rejected data elements. Cognitive system 216 can also log and/or report on data rejection and the activities of the cognitive system.

Acquisition and analysis of rejected data may be invoked through an application programming interface (API) opened by the cognitive system, for instance when cognitive system capabilities are offered as a service to customers who maintain or perform data integration processes. In this regard, aspects of the present invention may be a system to which customers call-out to in order to improve their ETL processing.

The cognitive system 216 may make modifications to the ETL tool/process 202. The modifications can be made through a wired/wireless communication link 218, in this example, for instance across a network, although any other communication path between the cognitive system and ETL tool/process may be used.

An example modification includes the reinjection of data, for instance by the cognitive system providing corrected data elements to the data integration tool for acceptance by the data integration tool and provision to the target (DSS in this example). Other example modifications are improvements to existing control rule(s), creation of new control rule(s), and deletion of bad control rule(s). The cognitive system can, for example, provide new or modified control rules, or an indication of control rule(s) to delete.

Existing ETL tools/processes can be modified as necessary to receive this feedback from the cognitive system, i.e. to accept the input from the cognitive system and implement any modifications or data injections as requested.

Figure 3:
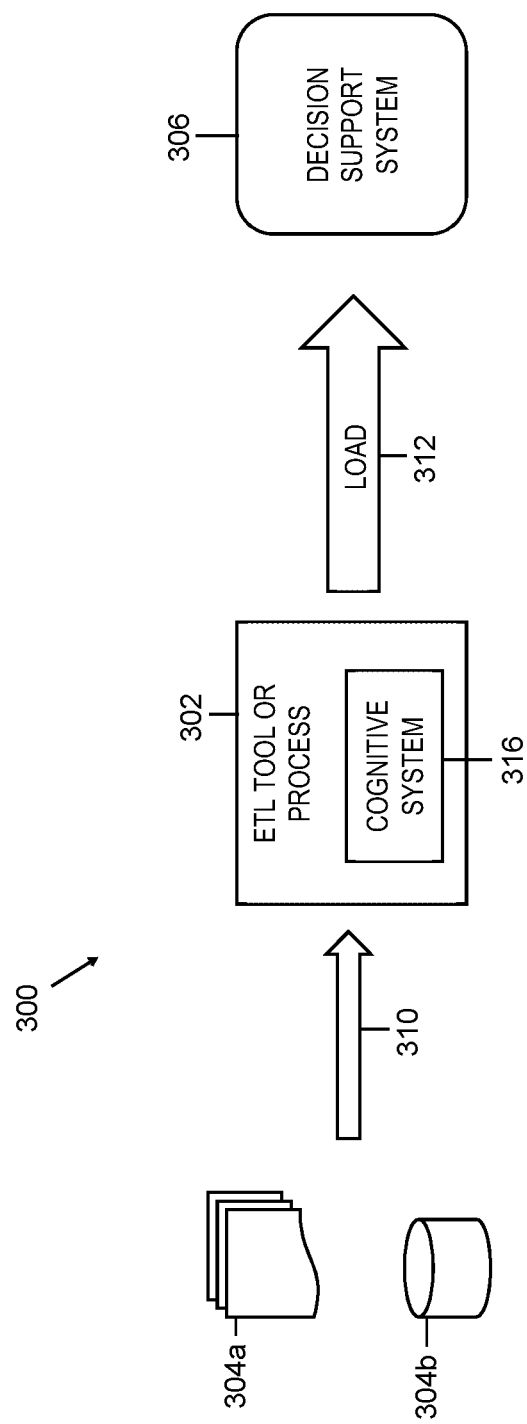
FIG. 3 depicts yet another example computing environment for data integration, in accordance with aspects described herein.

FIG. 3 depicts yet another example computing environment 300 for data integration, in accordance with aspects described herein. The environment 300 includes data sets/sources 304a, 304b, ETL tool/process 302, DSS 306, and communication links 310, 312 analogous to the corresponding components described with reference to FIG. 2. In the example of FIG. 3, the cognitive system 316 is incorporated into the ETL tool/process 302. In other words, the machine learning occurs in the cognitive system 316 of the ETL tool, and no cognitive system separate from the ETL tool is required. In this manner, the cognitive functions are moved into the ETL tool itself, as a new cognitive feature thereof, in order to improve its efficiency regarding data quality and data acceptance.

Accordingly, provided are capabilities to address data that was rejected, for instance because it did not match control criteria, by correcting and reinjecting, by a cognitive system, the corrected data to the data integration process. This improves data acceptance and increases data quality. The cognitive system provides an intelligent ingestion system that can learn from the rejected data and can adapt/update, automatically, independently, and in real-time in some examples, new or modified control rules itself.

Figure 4:
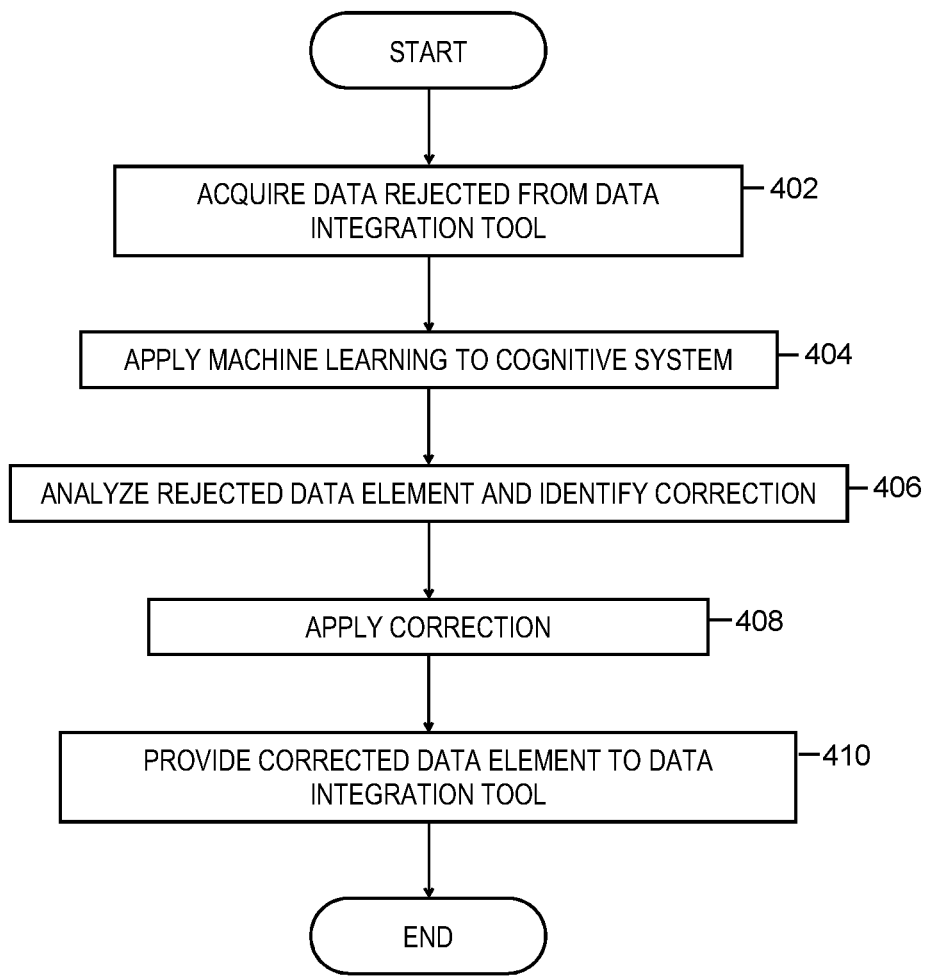
FIG. 4 depicts an example process of a cognitive system for data integration process refinement and correction of rejected data, in accordance with aspects described herein.

FIG. 4 depicts an example process of a cognitive system for data integration process refinement and correction of rejected data, in accordance with aspects described herein. In some examples, the process is performed by one or more computer systems, such as those described herein, which may include one or more computer systems implementing a cognitive system and/or data integration tool, or one or more other computer systems.

The process acquires rejected data from a data integration tool (such as ETL tool) (402). The rejected data is rejected by the data integration tool during a data integration process, such as an ETL process. The process also applies machine learning to the cognitive system (404), which in some examples is the system performing the process of FIG. 4. The machine learning may be a continuous process applied over a period of time.

The machine learning applied may be based at least in part on at least some of the acquired rejected data, and the machine learning can include training the cognitive system to identify corrections to data elements to facilitate data element acceptance by the data integration tool. By facilitating data element acceptance is meant that the corrections might inform refinements to the data integration tool in order for the tool to reduce its quantity of rejected data. Thus, the process can train the cognitive system through machine learning based, at least somewhat, on learning from the rejected data that has been collected. In some examples, the training includes receiving a corpus of information that indicates corrections to apply to data elements under different conditions. Training in this context can include loading a corpus of initial rules informing about corrections to apply to data elements.

The machine learning can also be based in part on external rules, knowledge, or other information provided to the cognitive system separate from the acquired rejected data. The cognitive system can therefore be trained and learn from knowledge internal to the data integration process, e.g. data rejections, as well as external knowledge, such as knowledge gleaned from other data integration tools, administrator input, and any other external knowledge.

The acquired rejected data can include data elements, for examples values, or data structures. The process of FIG. 4 continues by analyzing a data element of the acquired rejected data and identifying a correction to apply to the data element (406). The process also applies the correction to the data element to obtain a corrected data element (408) for reinjection into the data integration tool. In some examples, the application of the correction is automatic in that the process automatically applies the correction to the data element absent/without a separate approval of that correction from a user. In other examples, the process first proposes the correction to a user or other entity for assessment and approval, and then applies the correction to the data element based on receiving such approval of the correction (otherwise discarding the correction if not approved).

With the corrected data element having been obtained, the process provides, e.g. for injection, the corrected data element to the data integration tool for acceptance by the data integration tool and subsequent provision to a target (410). In some examples, the data integration tool reconsiders and accepts or rejects the corrected data element, while in others the corrected data element may be loaded without a separate confirmation that the correction results in acceptance.

In some examples, the process also includes modifying the data integration tool based on identified correction(s), i.e. by learning from the correction(s) applied to data element(s). As an example, if it is found that the cognitive system consistently applies a common correction, the system might identify a control rule to implement in the data integration tool in order to proactively address what might otherwise lead to data rejections. Modifying the data integration tool can include adding, modifying, or removing control rules, as examples. In some examples, the data integration tool includes or is an extract, transform, load (ETL) tool, and the modifying modifies the extract, transform, load tool by loading a new control rule or modifying an existing control rule of the extract, transform, load tool. Additionally or alternatively, the modifying can include proposing a new control rule for automatic or user-approved application to the data integration tool. Additionally or alternatively, the modifying can include, based on identifying an existing control rule, of the data integration tool, responsible for rejecting the data element, performing at least one selected from the group consisting of: modifying the existing control rule, deleting the existing control rule, or replacing the existing control rule with a different control rule.

Adding, modifying or deleting control rules of a data integration tool can be performed to address what would otherwise result in data rejections. These modifications to the data integration tool can increase subsequent data acceptance by the data integration tool—that is acceptance of data that might otherwise have led to data rejection(s).

One or more of the analyzing the data element (406), applying the correction (408), and providing the corrected data element (410) can be performed by the cognitive system. Additionally or alternatively, the cognitive system itself may be a component of the data integration tool, with a result that the cognitive processing to correct data elements and modify the data integration tool through implementation of control rules can be integrated directly into the data integration tool. In some examples, the process of FIG. 4 includes exposing an application programming interface of the cognitive system, with the application programming interface being configured as an interface through which the acquiring and the analyzing are invoked.

Although various examples are provided, variations are possible without departing from a spirit of the claimed aspects.

Figure 5:
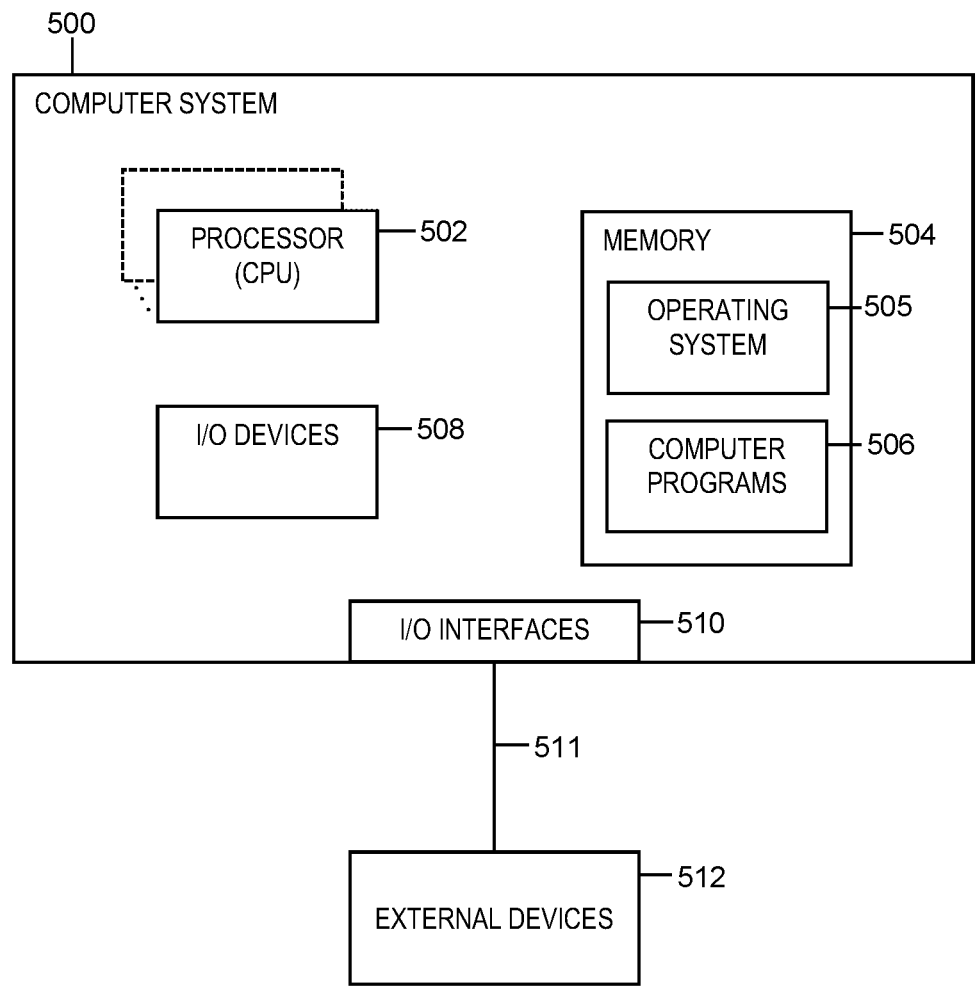
FIG. 5 depicts one example of a computer system and associated devices to incorporate and/or use aspects described herein.

Processes described herein may be performed singly or collectively by one or more computer systems, such as cognitive computer system(s) and/or computer system(s) performing data integration processing or executing a data integration tool, as examples. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), or Intel Corporation (Santa Clara, Calif., USA), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 6.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
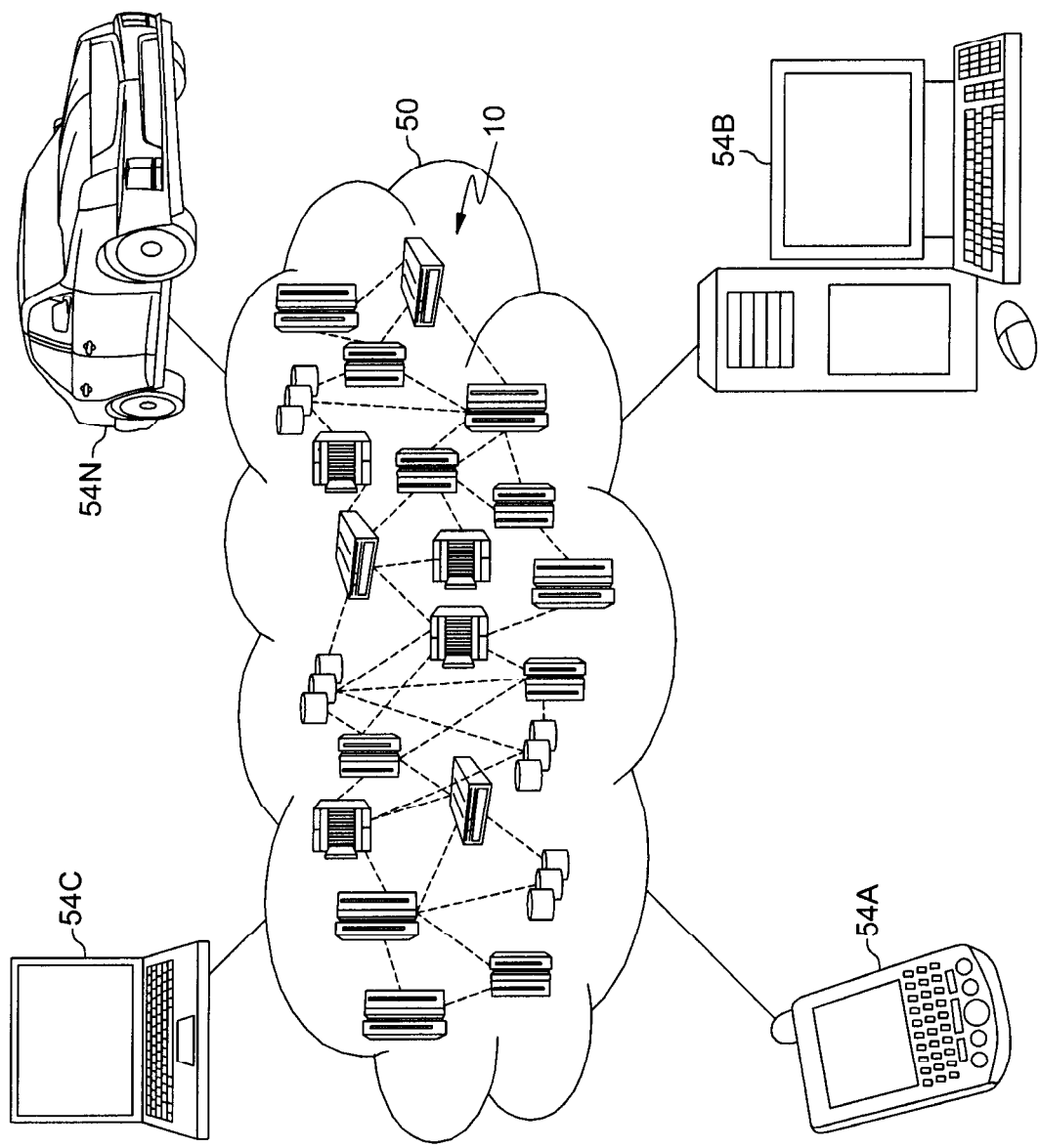
FIG. 6 depicts a cloud computing environment according to an embodiment of the present invention.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
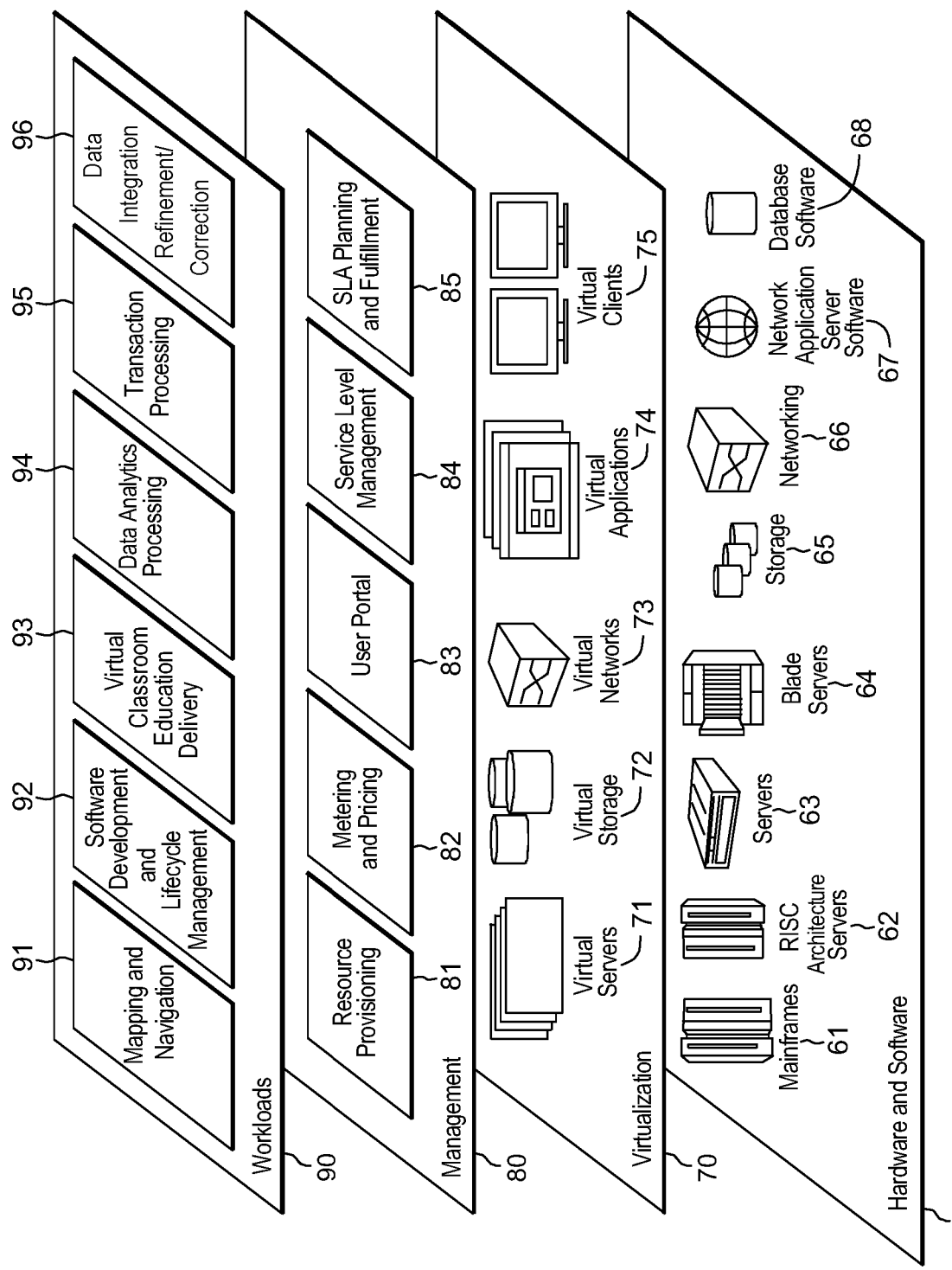
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data integration refinement/data element correction 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   extracting data from one or more data sets, the extracted data to be transformed for acceptance and loading to a target database, wherein one or more controls govern acceptance of data by the target database;
   as part of a data integration process, performing a transformation on the extracted data to transform the extracted data into transformed data for acceptance and loading to the target database, wherein, as part of the data integration process, data, of the extracted and transformed data, is rejected by a data integration tool based on the one or more controls governing acceptance of data by the target database;
   acquiring the rejected data from the data integration tool;
   applying machine learning to a cognitive system, the machine learning being based at least in part on at least some of the acquired rejected data, and the machine learning comprising training the cognitive system to identify corrections to data elements, including corrections to at least some of the acquired rejected data, to facilitate data element acceptance by the data integration tool;
   analyzing a data element of the acquired rejected data and identifying, using the trained cognitive system, a correction to apply to the data element;
   applying the correction to the data element to obtain a corrected data element;
   providing the corrected data element to the data integration tool for acceptance by the data integration tool and provision to a target; and
   modifying the data integration tool based on the identified correction, wherein the modifying comprises, based on identifying an existing control rule, of the data integration tool, responsible for rejecting the data element, performing at least one selected from the group consisting of: modifying the existing control rule, deleting the existing control rule, or replacing the existing control rule with a different control rule, to increase subsequent data acceptance by the data integration tool.

2. The method of claim 1, wherein the modifying the data integration tool comprises proposing a new control rule for automatic or user-approved application to the data integration tool, the new control rule configured to increase subsequent data acceptance by the data integration tool.

3. The method of claim 1, wherein the data integration tool comprises an extract, transform, load tool, and wherein the modifying the data integration tool modifies the extract, transform, load tool by modifying a control rule of the extract, transform, load tool.

4. The method of claim 1, wherein the analyzing the data element, applying the correction, and providing the corrected data element are performed by the cognitive system, and wherein the cognitive system is a component of the data integration tool.

5. The method of claim 1, further comprising proposing the correction to a user for approval and performing the applying the correction to the data element based on user approval of the correction.

6. The method of claim 1, wherein the applying the correction comprises automatically applying the correction to the data element absent separate user approval of the correction.

7. The method of claim 1, wherein the training comprises receiving a corpus of information indicating corrections to apply to data elements under different conditions.

8. The method of claim 1, further comprising exposing an application programming interface of the cognitive system, the application programming interface configured as an interface through which the acquiring and the analyzing are invoked.

9. A computer system comprising:
   a memory; and
   a processor in communication with the memory, wherein the computer system is configured to perform a method comprising:
      extracting data from one or more data sets, the extracted data to be transformed for acceptance and loading to a target database, wherein one or more controls govern acceptance of data by the target database;
      as part of a data integration process, performing a transformation on the extracted data to transform the extracted data into transformed data for acceptance and loading to the target database, wherein, as part of the data integration process, data, of the extracted and transformed data, is rejected by a data integration tool based on the one or more controls governing acceptance of data by the target database;
      acquiring the rejected data from the data integration tool;
      applying machine learning to a cognitive system, the machine learning being based at least in part on at least some of the acquired rejected data, and the machine learning comprising training the cognitive system to identify corrections to data elements, including corrections to at least some of the acquired rejected data, to facilitate data element acceptance by the data integration tool;

analyzing a data element of the acquired rejected data and identifying, using the trained cognitive system, a correction to apply to the data element;

applying the correction to the data element to obtain a corrected data element;

providing the corrected data element to the data integration tool for acceptance by the data integration tool and provision to a target; and modifying the data integration tool based on the identified correction, wherein the modifying comprises, based on identifying an existing control rule, of the data integration tool, responsible for rejecting the data element, performing at least one selected from the group consisting of: modifying the existing control rule, deleting the existing control rule, or replacing the existing control rule with a different control rule, to increase subsequent data acceptance by the data integration tool.

10. The computer system of claim 9, wherein the modifying the data integration tool comprises proposing a new control rule for automatic or user-approved application to the data integration tool, the new control rule configured to increase subsequent data acceptance by the data integration tool.

11. The computer system of claim 9, wherein the data integration tool comprises an extract, transform, load tool, and wherein the method further comprises modifying the extract, transform, load tool based on the identified correction, wherein the modifying the data integration tool modifies the extract, transform, load tool by modifying a control rule of the extract, transform, load tool.

12. The computer system of claim 9, wherein the analyzing the data element, applying the correction, and providing the corrected data element are performed by the cognitive system, and wherein the cognitive system is a component of the data integration tool.

13. The computer system of claim 9, wherein the method further comprises exposing an application programming interface of the cognitive system, the application programming interface configured as an interface through which the acquiring and the analyzing are invoked.

14. A computer program product comprising:
a computer readable storage medium readable by a processor and storing instructions for execution by the processor for performing a method comprising:
extracting data from one or more data sets, the extracted data to be transformed for acceptance and loading to a target database, wherein one or more controls govern acceptance of data by the target database;

as part of a data integration process, performing a transformation on the extracted data to transform the extracted data into transformed data for acceptance and loading to the target database, wherein, as part of the data integration process, data, of the extracted and transformed data, is rejected by a data integration tool based on the one or more controls governing acceptance of data by the target database;

acquiring the rejected data from the data integration tool;

applying machine learning to a cognitive system, the machine learning being based at least in part on at least some of the acquired rejected data, and the machine learning comprising training the cognitive system to identify corrections to data elements, including corrections to at least some of the acquired rejected data, to facilitate data element acceptance by the data integration tool;

analyzing a data element of the acquired rejected data and identifying, using the trained cognitive system, a correction to apply to the data element;

applying the correction to the data element to obtain a corrected data element;

providing the corrected data element to the data integration tool for acceptance by the data integration tool and provision to a target; and modifying the data integration tool based on the identified correction, wherein the modifying comprises, based on identifying an existing control rule, of the data integration tool, responsible for rejecting the data element, performing at least one selected from the group consisting of: modifying the existing control rule, deleting the existing control rule, or replacing the existing control rule with a different control rule, to increase subsequent data acceptance by the data integration tool.

15. The computer program product of claim 14, wherein the modifying the data integration tool comprises proposing a new control rule for automatic or user-approved application to the data integration tool, the new control rule configured to increase subsequent data acceptance by the data integration tool.

16. The computer program product of claim 14, wherein the data integration tool comprises an extract, transform, load tool, and wherein the method further comprises modifying the extract, transform, load tool based on the identified correction, wherein the modifying the data integration tool modifies the extract, transform, load tool by modifying a control rule of the extract, transform, load tool.

* * * * *